(12) United States Patent
Chang et al.

(10) Patent No.: US 10,583,818 B2
(45) Date of Patent: Mar. 10, 2020

(54) BRAKE DEVICE AND AUTOMATIC DRIVING VEHICLE USING THE SAME

(71) Applicant: Acer Incorporated, New Taipei (TW)

(72) Inventors: Kuo-Hui Chang, New Taipei (TW); Shao-Chi Chuang, New Taipei (TW); Wen-Shu Lee, New Taipei (TW)

(73) Assignee: Acer Incorporated, New Taipei (TW)

( * ) Notice: Subject to any disclaimer, the term of this patent is extended or adjusted under 35 U.S.C. 154(b) by 121 days.

(21) Appl. No.: 15/943,684

(22) Filed: Apr. 2, 2018

(65) Prior Publication Data
US 2019/0071060 A1 Mar. 7, 2019

(30) Foreign Application Priority Data

Sep. 5, 2017 (TW) .............................. 106130246 A (51) Int. Cl.
*B60T 7/12* (2006.01)
*B60T 11/10* (2006.01)
(Continued)

(52) U.S. Cl.
CPC ............. *B60T 11/102* (2013.01); *B60T 7/06* (2013.01); *B60T 11/18* (2013.01); *B60T 13/66* (2013.01);
(Continued)

(58) Field of Classification Search
CPC ... B60T 7/02; B60T 7/04; B60T 7/042; B60T 7/12; B60T 13/745; B60T 13/746; B60T 2270/402; B60T 2270/404; G05G 1/46
See application file for complete search history.

(56) References Cited

U.S. PATENT DOCUMENTS 3,327,479 A * 6/1967 Harness ................ B60T 13/143
60/550
4,078,385 A * 3/1978 Zabadneh ............... B60T 13/12
60/548
(Continued)

FOREIGN PATENT DOCUMENTS

CN 103754206 4/2014
CN 206107225 4/2017
(Continued)

OTHER PUBLICATIONS

Machine translation of JP 2003-200821, retrieved Sep. 25, 2019 (Year: 2019).*

Primary Examiner — Bradley T King
(74) Attorney, Agent, or Firm — JCIPRNET (57) ABSTRACT

A brake device and an automatic driving vehicle using the same are provided. The brake device includes an electrically controlled brake assembly, a mechanically controlled brake assembly and a shaft. The electrically controlled brake assembly has a main body and a brake control link. The shaft is connected between the electrically controlled brake assembly and the mechanically controlled brake assembly. The mechanically controlled brake assembly includes a pedal, an elbow, a brake link group and a brake pump. The first end is connected to the pedal, and the fulcrum is between the first end and the second end and is located close to the second end. The brake link group is connected between the elbow and the brake control link. The brake pump has an adjustable rod, and one link of the brake link group is connected to the adjustable rod.

10 Claims, 8 Drawing Sheets

(51) Int. Cl.
  *B60T 13/66* (2006.01)
  *B60T 7/06* (2006.01)
  *B60T 13/74* (2006.01)
  *B60T 11/18* (2006.01)

(52) U.S. Cl.
  CPC .......... *B60T 13/662* (2013.01); *B60T 13/746* (2013.01); *B60T 2270/404* (2013.01)

(56) References Cited

U.S. PATENT DOCUMENTS

| | | | | |
|---|---|---|---|---|
| 4,520,907 A | * | 6/1985 | Sikora | B60T 17/18 188/151 A |
| 6,223,865 B1 | * | 5/2001 | Lang | B60T 1/065 188/265 |
| 2005/0230198 A1 | * | 10/2005 | Rodriguez | B60T 7/045 188/106 P |
| 2009/0121518 A1 | * | 5/2009 | Leonard | B60T 7/06 296/183.1 |
| 2010/0126167 A1 | * | 5/2010 | Nagel | B60T 7/042 60/545 |
| 2010/0313699 A1 | * | 12/2010 | Yoshida | B60T 7/042 74/512 |
| 2011/0253489 A1 | | 10/2011 | Ward | |
| 2013/0333377 A1 | * | 12/2013 | Feuerrohr | B60T 11/18 60/545 |
| 2014/0159475 A1 | * | 6/2014 | Schmidt | B60T 7/107 303/15 |
| 2016/0121869 A1 | * | 5/2016 | Cann | B60T 13/746 188/156 |
| 2017/0174189 A1 | * | 6/2017 | Richards | B60T 7/042 |
| 2018/0141531 A1 | * | 5/2018 | Brok | B60T 13/745 |
| 2018/0273011 A1 | * | 9/2018 | Wingender | B60T 13/745 |

FOREIGN PATENT DOCUMENTS

| | | | |
|---|---|---|---|
| JP | 3032407 | | 4/2000 |
| JP | 2003200821 A | * | 7/2003 |
| JP | 5156115 | | 3/2013 |
| TW | 201313512 | | 4/2013 |

\* cited by examiner

BRAKE DEVICE AND AUTOMATIC DRIVING VEHICLE USING THE SAME

CROSS-REFERENCE TO RELATED APPLICATION

This application claims the priority benefit of Taiwan application serial no. 106130246, filed on Sep. 5, 2017. The entirety of the above-mentioned patent application is hereby incorporated by reference herein and made a part of this specification.

BACKGROUND OF THE INVENTION

Field of the Invention

The present invention relates to a brake device and an automatic driving vehicle, and more particularly to a brake device that secures safety and an automatic driving vehicle using the brake device.

Description of Related Art

An automatic driving vehicle, such as a golf cart, is usually controlled by a computer system to move or to stop. In other words, the brake system of the golf cart is controlled by a computer system. When the computer system operates normally, the moving and stopping of the golf cart are controlled normally by the computer system, so the safety of the passengers is secured. However, when the computer system fails and is no longer able to control the moving or stopping of the golf cart, the passengers may be put in risk.

SUMMARY OF THE INVENTION

The invention provides a brake device having both electrically controlled and mechanically controlled brake system.

The invention provides an automatic driving vehicle wherein a brake device has both electrically controlled and mechanically controlled brake system and thus the safety of the passengers is secured.

The brake device is adapted for an automatic driving vehicle. The brake device includes an electrically controlled brake assembly, a mechanically controlled brake assembly and a shaft. The electrically controlled brake assembly has a main body and a brake control link. The mechanically controlled brake assembly is connected to the brake control link by the shaft. The mechanically controlled brake assembly includes a pedal, an elbow, a brake link group and a brake pump. The elbow has a first end, a second end and a fulcrum. The first end is connected to the pedal, and the fulcrum is located between the first end and the second end and is close to the second end. The brake link group is connected between the second end of the elbow and the brake control link by the shaft. The brake pump has an adjustable rod, and one link of the brake link group is connected to the adjustable rod of the brake pump.

The automatic driving vehicle of the invention includes a body, a central control unit and a brake device. The body has a plurality of seats and a steering wheel. The central control unit is disposed on the body. The brake device is disposed under the plurality of seats and is electrically connected to the central control unit. The brake device includes an electrically controlled brake assembly, a mechanically controlled brake assembly and a shaft. The electrically controlled brake assembly includes a main body and a brake control link. The mechanically controlled brake assembly is connected to the brake link group by the shaft. The mechanically controlled brake assembly includes a pedal; an elbow, a brake link group and a brake pump. The pedal is located under the steering wheel. The elbow has a first end, a second end and a fulcrum. The first end is connected to the pedal, and the fulcrum is located between the first end and the second end and is close to the second end. The brake link group is connected between the second end of the elbow and the brake control link by the shaft. The brake pump has an adjustable rod, and one link of the brake link group is connected to the adjustable rod of the brake pump.

Based on the above, since the brake device of the invention has both electrically controlled and mechanically controlled brake system, even if the electrically controlled brake assembly fails while the automatic driving vehicle is moving, the passenger may still stop the automatic driving vehicle with the pedal. Therefore, the brake device of the invention and the automatic driving vehicle using the brake device secures the safety of the passengers.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Some other embodiments of the invention are provided as follows. It should be noted that the reference numerals and part of the contents of the previous embodiment are used in the following embodiments, in which identical reference numerals indicate identical or similar components, and repeated description of the same technical contents is omitted. Please refer to the description of the previous embodiment for the omitted contents, which will not be repeated hereinafter.

Figure 1:
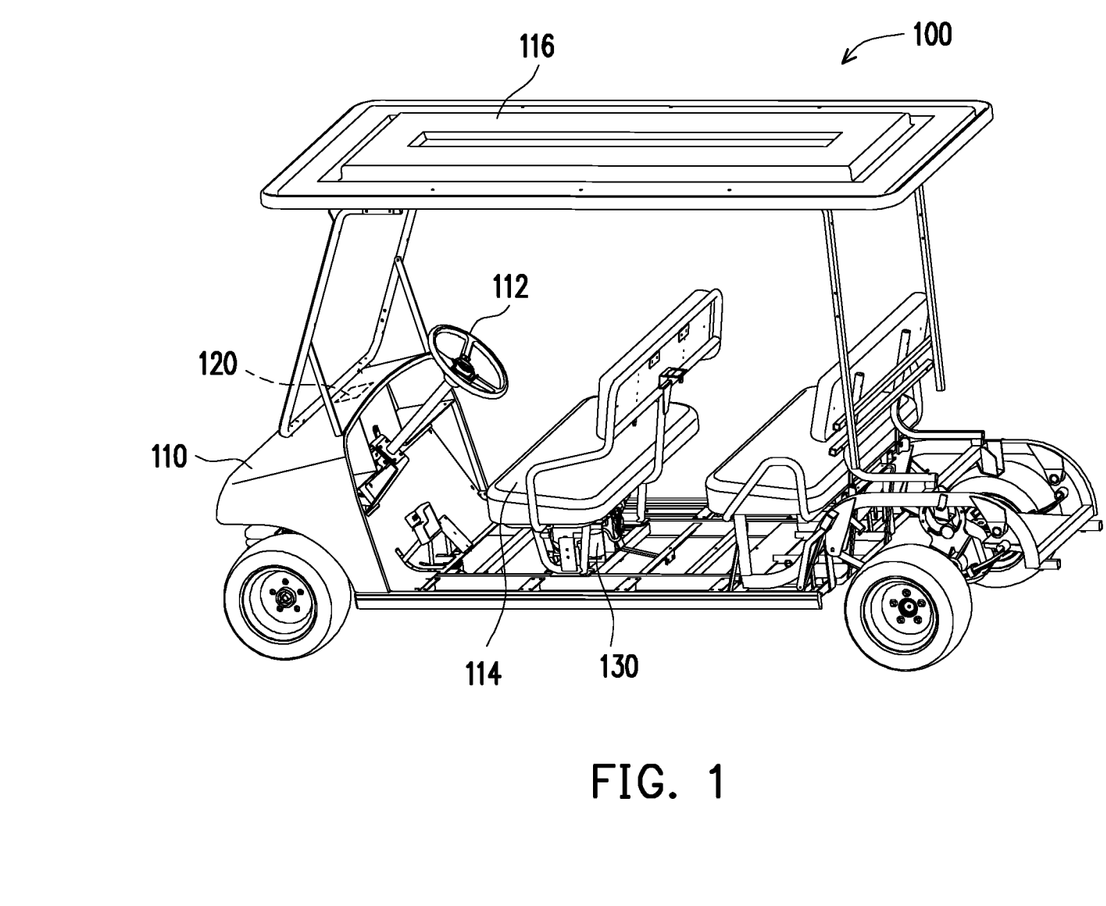
FIG. 1 is a schematic view of an automatic driving vehicle of the invention.
Figure 2:
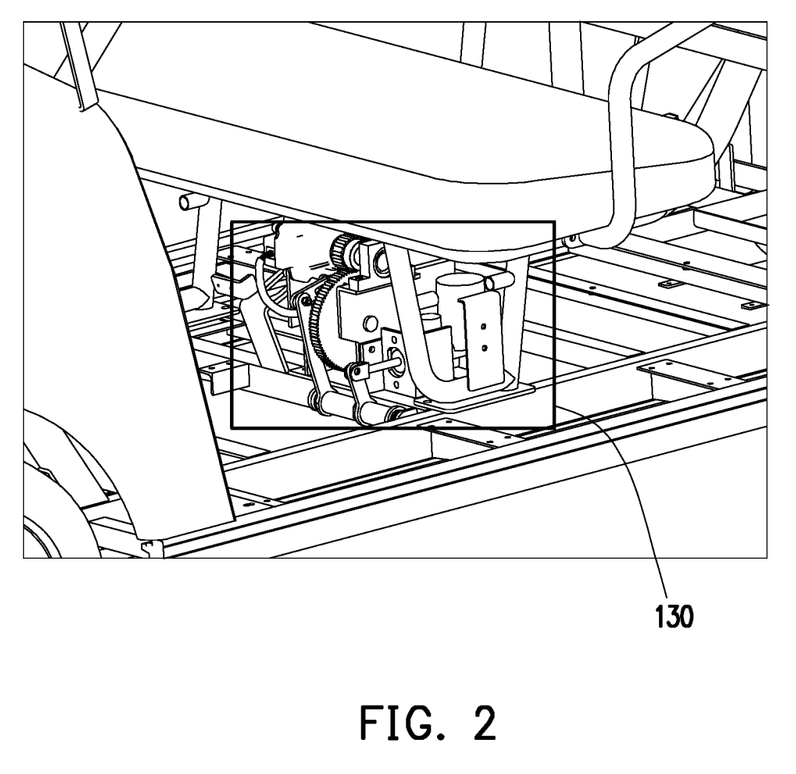
FIG. 2 is a schematic partially enlarged view of the automatic driving vehicle of FIG. 1.

FIG. 1 is a schematic view of an automatic driving vehicle of the invention, and FIG. 2 is a schematic partially enlarged view of the automatic driving vehicle of FIG. 1. Please refer to both FIG. 1 and FIG. 2. The automatic driving vehicle of the invention is, for example, a golf cart 100 for transporting passengers in a short-distance. The golf cart 100 usually moves only within the golf course, so the moving range of the golf cart 100 is limited inside the golf course. The moving, stopping and moving route of the golf cart 100 may be controlled by a computer system.

The golf cart 100 includes a body 110, a central control unit 120 and a brake device 130, wherein the body 110 has a steering wheel 112 and a plurality of seats 114 and may further have a roof 116 disposed over the plurality of seats 114 and covering all the plurality of seats 114 to avoid the passengers from direct sun. The central control unit 120 is disposed on the body 110 and is electronically connected to the brake device 130. The brake device 130 is disposed under the plurality of seats 114 and thus does not affect the driver's seat space.

Figure 3A:
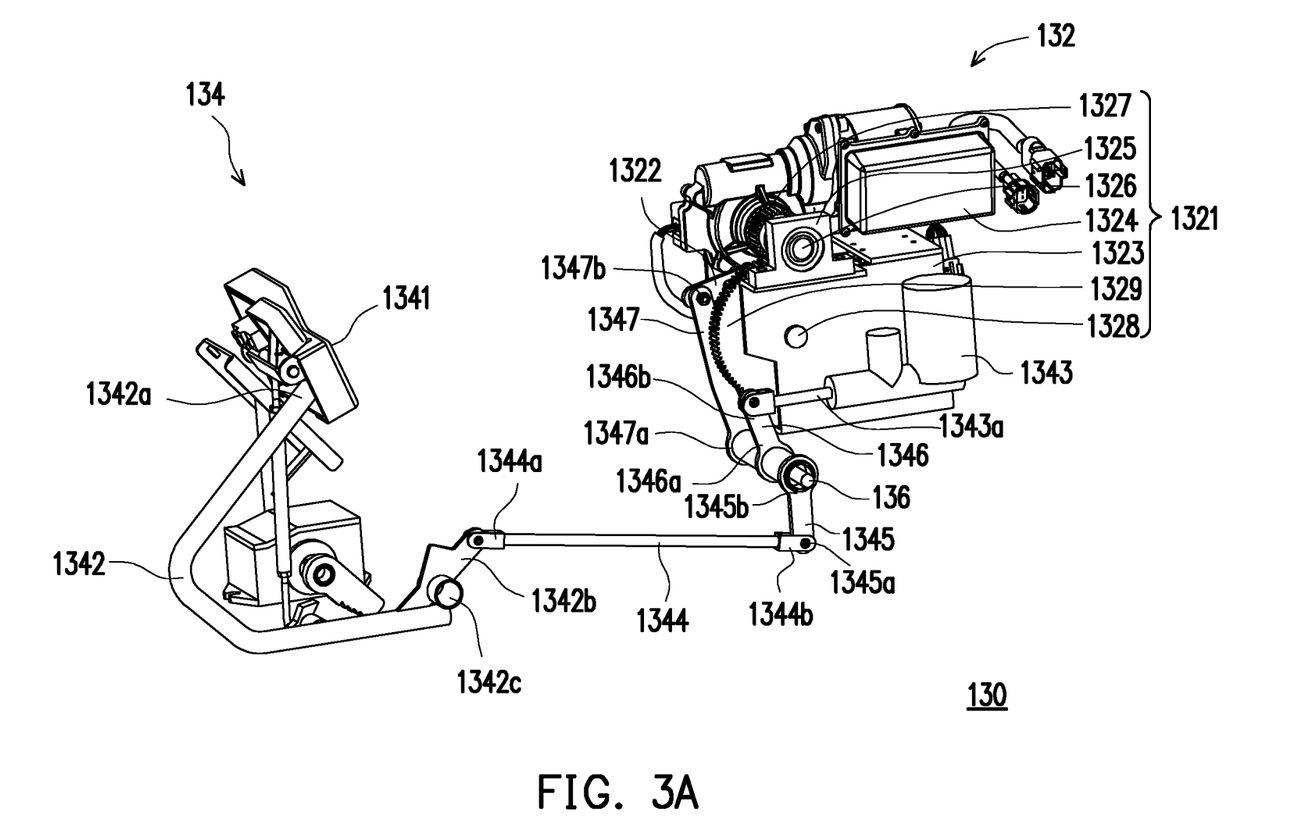
FIG. 3A is a schematic assembly view of the automatic driving vehicle of FIG. 2.
Figure 3B:
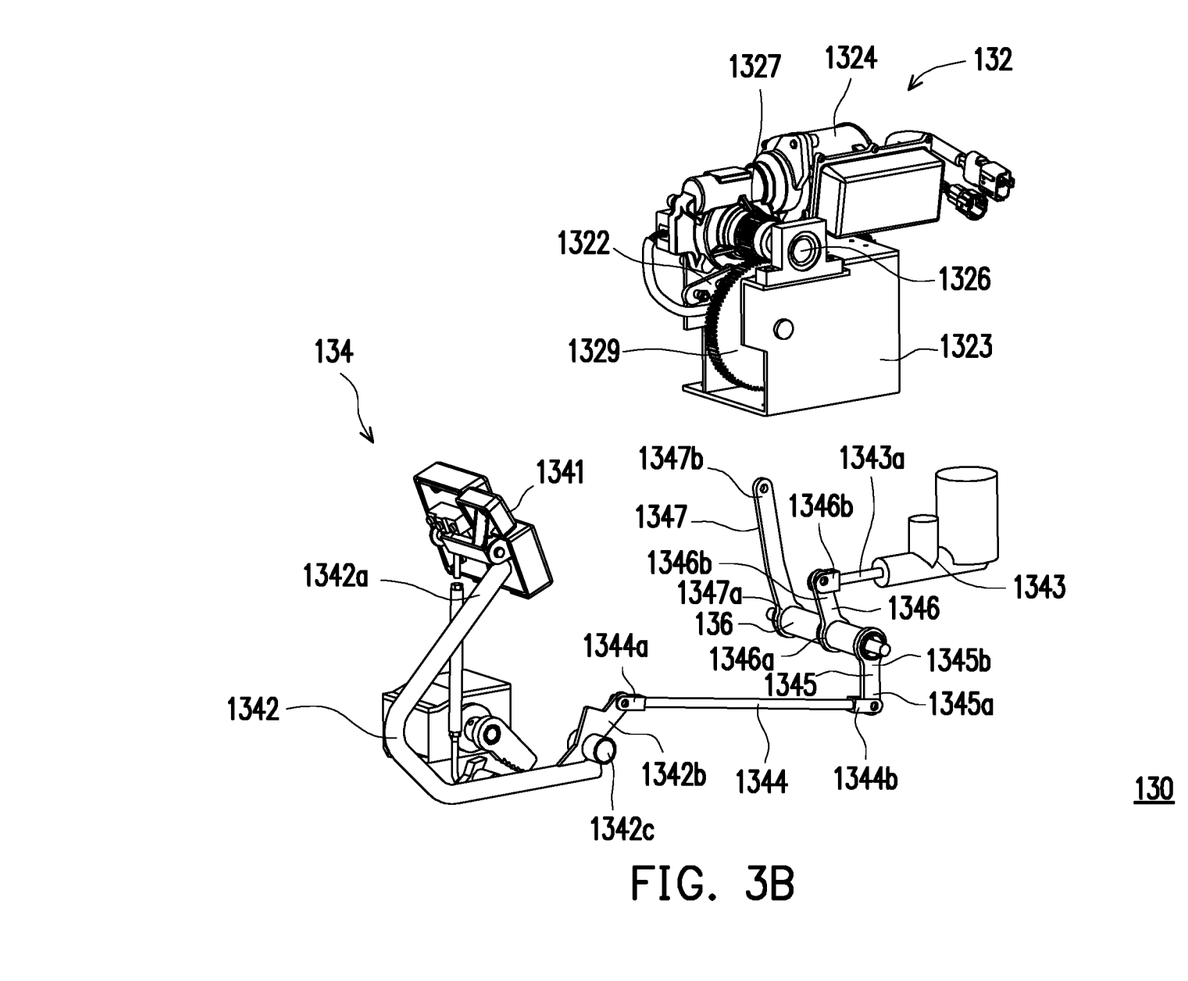
FIG. 3B is a schematic exploded view of an electrically controlled brake assembly and a mechanically controlled brake assembly of the brake device of FIG. 3A.
Figure 3C:
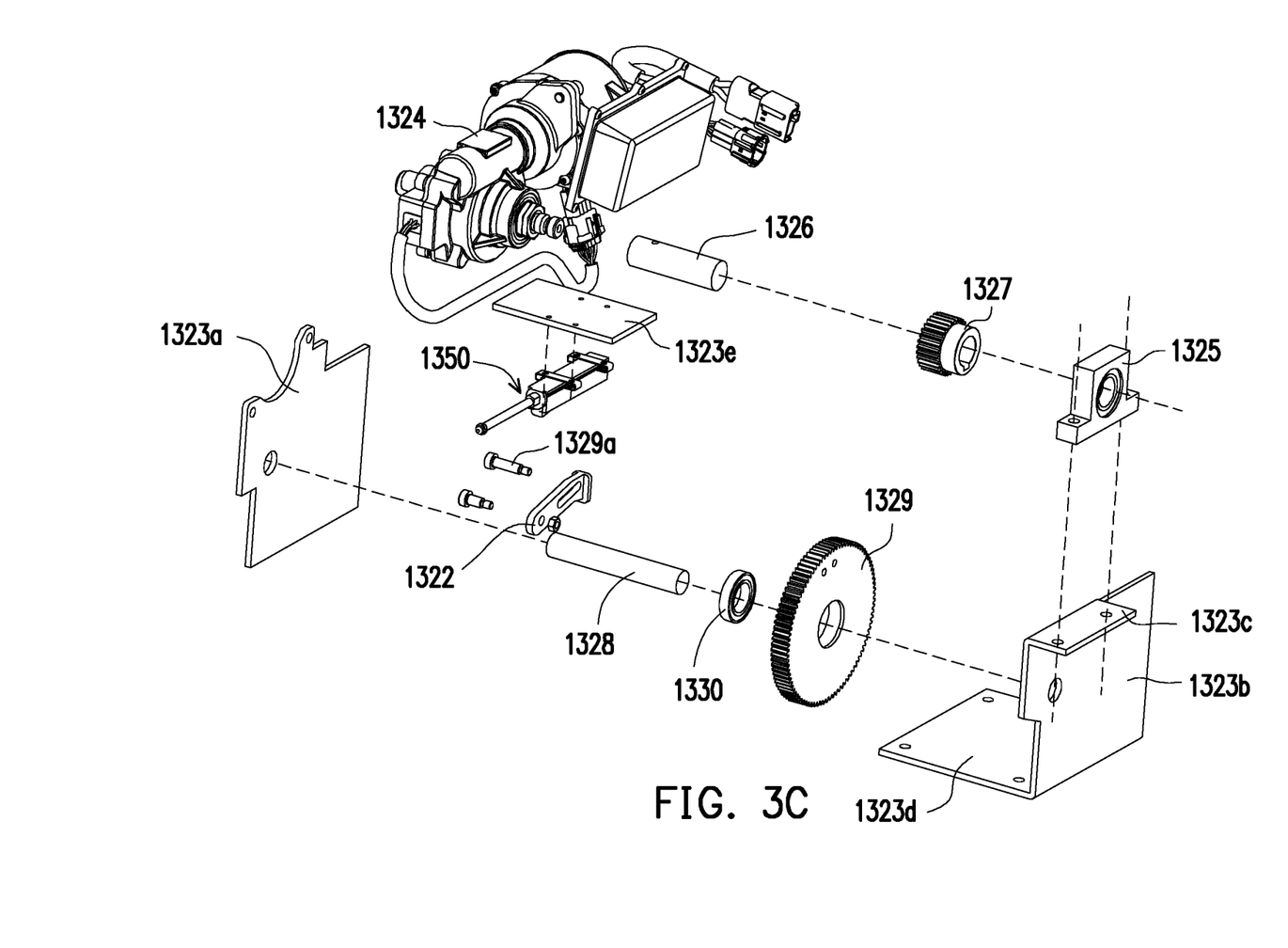
FIG. 3C is a schematic exploded view of the electrically controlled brake assembly of FIG. 3B.

FIG. 3A is a schematic assembly view of the automatic driving vehicle of FIG. 2, FIG. 3B is a schematic exploded view of an electrically controlled brake assembly and a mechanically controlled brake assembly of the brake device of FIG. 3A, and FIG. 3C is a schematic exploded view of the electrically controlled brake assembly of FIG. 3B. Please refer to FIG. 3A, FIG. 3B and FIG. 3C. The brake device 130 includes an electrically controlled brake assembly 132, a mechanically controlled brake assembly 134 and a shaft 136. The electrically controlled brake assembly 132 includes a main body 1321 and a brake control link 1322. The mechanically controlled brake assembly 134 is connected to the brake control link 1322 by the shaft 136.

As described above, the main body 1321 of the electrically controlled brake assembly 132 includes a fixing base 1323, an electrically controlled motor 1324, a bearing housing 1325, a first axis rod 1326, a first gear 1327, a second axis rod 1328, a second gear 1329 and a bearing 1330.

The fixing base 1323 includes a first side wall 1323a and a second side wall 1323b disposed along a vertical direction, wherein the second side wall 1323b has a wing 1323c extending horizontally. In addition, the fixing base 1323 further includes a bottom plate 1323d extending horizontally from a bottom of the second side wall 1323b, and the first side wall 1323a is disposed on the bottom plate 1323d. Moreover, the fixing base 1323 further includes a top plate 1323e connected between a top of the first side wall 1323a and a top of the second side wall 1323b. The top plate 1323e may have an area smaller than an area of the bottom plate 1323d depending on a shape of the electrically controlled motor 1324 and related components of the electrically controlled motor 1324.

The electrically controlled motor 1324 is disposed on the fixing base 1323, and the bearing housing 1325 is disposed on the wing 1323c of the second side wall 1323b of the fixing base 1323. The first axis rod 1326 is connected to the electrically controlled motor 1324 and is fixed on the bearing housing 1325. The first gear 1327 is installed on the first axis rod 1326 and is located between the electrically controlled motor 1324 and the bearing housing 1325. Two ends of the second axis rod 1328 are fixed on two opposite side walls of the fixing base 1323, namely the first side wall 1323a and the second side wall 1323b. The second gear 1329 is installed on the second axis rod 1328 and is engaged with the first gear 1327. In addition, the second gear 1329 has a protruding portion 1329a on a surface, the brake control link 1322 has a guide rail portion 1322a, and the protruding portion 1329a is located in the guide rail portion 1322a. The bearing 1330 is installed on the second axis rod 1328 and is close to the second gear 1329.

The mechanically controlled brake assembly 134 includes a pedal 1341; an elbow 1342, a brake link group and a brake pump 1343. The pedal 1341 is located under the steering wheel 112. The elbow 1342 has a first end 1342a, a second end 1342b and a fulcrum 1342c. The fulcrum 1342c is located between the first end 1342a and the second end 1342b and is close to the second end 1342b. The brake link group is connected between the second end 1342b of the elbow 1342 and the brake control link 1322 by the shaft 136. The brake pump 1343 has an adjustable rod 1343a, wherein one link of the brake link group is connected to the adjustable rod 1343a of the brake pump 1343.

In detail, the brake link group includes a first brake link 1344, a second brake link 1345, a third brake link 1346 and a fourth brake link 1347. The first brake link 1344 has a third end 1344a and a fourth end 1344b. The first brake link 1344 extends from under the plurality of seats 114 to under the steering wheel 112 for the third end 1344a to be connected to the second end 1342b of the elbow 1342. The second brake link 1345 has a fifth end 1345a and a sixth end 1345b. The fifth end 1345a is connected to the fourth end 1344b of the first brake link 1344, and the sixth end 1345b is installed on the shaft 136 for the second brake link 1345 to rotate relative to the shaft 136. The third brake link 1346 has a seventh end 1346a and an eighth end 1346b. The seventh end 1346a is installed on the shaft 136 in a distance to the sixth end 1345b for the third brake link 1346 to rotate relative to the shaft 136. The eighth end 1346b is connected to the adjustable rod 1343a of the brake pump 1343. The fourth brake link 1347 has a ninth end 1347a and a tenth end 1347b. The ninth end 1347a is installed on the shaft 136 in a distance to the seventh end 1346a. The tenth end 1347b is connected to the brake control link 1322.

Passengers sit on the plurality of seats 114 after getting in the golf cart 100. The brake device 130 is disposed under a driver's seat of the plurality of seats 114. The electrically controlled brake assembly 132 of the brake device 130 has a small overall size, and only the brake link group extends from under the pedal 1341 of the body 110 toward the steering wheel 112, so the brake device 130 does not bother the driver.

After the driver starts the golf cart 100 and the golf cart 100 starts moving, the driver holds the steering wheel 112 to control the moving direction of the golf cart 100. At this moment, it is the central control unit 120 that controls the brake device 130.

Figure 5:
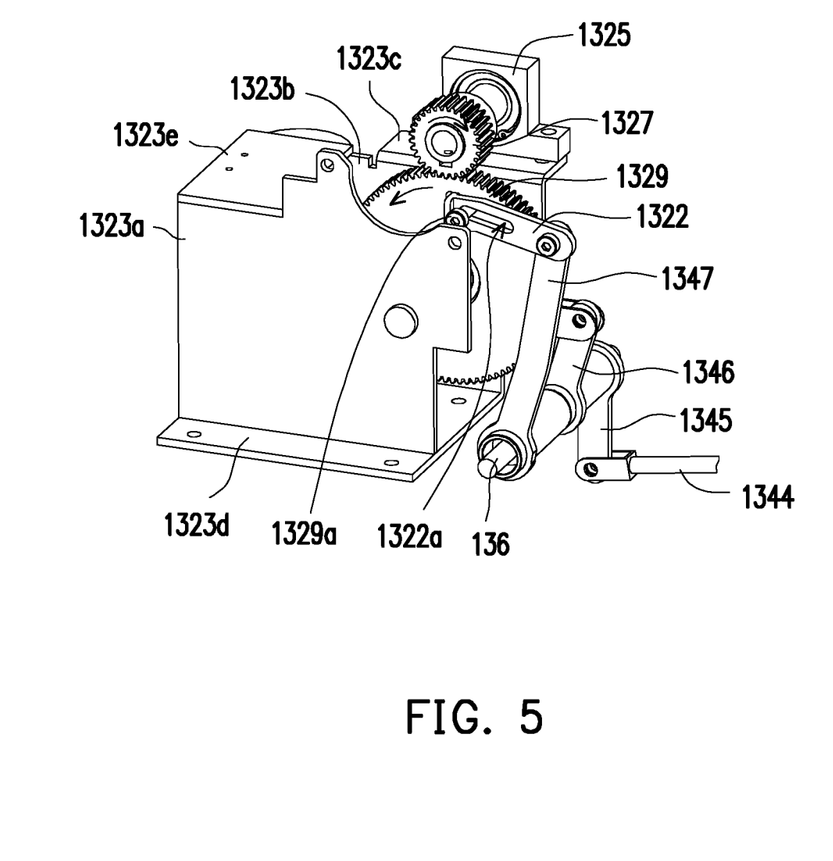
FIG. 5 is a schematic partial view of the brake device of FIG. 4 from a different perspective.

It should be noted that, in an electronically controlled mode, i.e. when the central control unit 120 operates normally, no external force is applied to the pedal 1341 of the mechanically controlled brake assembly 134, and the central control unit 120 controls the electrically controlled brake assembly 132, the protruding portion 1329a formed on the surface of the second gear 1329 is located in an end of the guide rail portion 1322a of the brake control link 1322. As shown in FIG. 5, the protruding portion 1329a is located in a left end of the guide rail portion 1322a.

Figure 4:
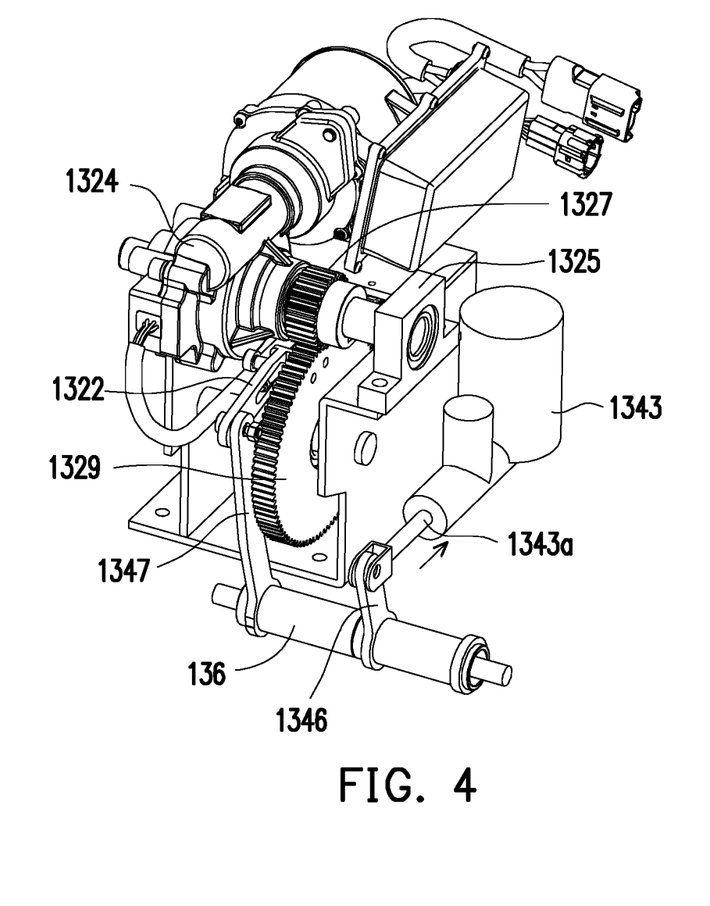
FIG. 4 is a partially enlarged view of the brake device of FIG. 3A.

Please refer to FIG. 1, FIG. 4 and FIG. 5. To apply a brake in an electronically controlled mode, the electrically controlled motor 1324 operates upon the central control unit 120 sending a signal to the electrically controlled brake assembly 132 of the brake device 130. The electrically controlled motor 1324 drives the first gear 1327 to rotate in a counterclockwise direction (as shown in FIG. 4) and drives the second gear 1329 engaged with the first gear 1327 to rotate in a clockwise direction (as shown in FIG. 4). Since the protruding portion 1329a of the second gear 1329 is located in the guide rail portion 1322a of the brake control link 1322, the brake control link 1322 is driven by the second gear 1329 and thus shifts in position and rotates in a clockwise direction along with the rotation of the second gear 1329. In order to obtain a linear displacement of the brake control link 1322, the brake device 130 may further include a resistance scale 1350. The resistance scale 1350 may be disposed under the top plate 1323e of the fixing base 1323 for measuring a linear displacement of the brake control link 1322 when the brake control link 1322 is moving.

As described above, since the second brake link 1345, the third brake link 1346 and the fourth brake link 1347 are all fixed on the same shaft 136, the second brake link 1345, the third brake link 1346 and the fourth brake link 1347 moves synchronously.

Therefore, at the same time, the third brake link 1346 moving synchronously with the fourth brake link 1347 also rotates in a clockwise direction. The third brake link 1346 drives the adjustable rod 1343a of the brake pump 1343 to push a piston, deliver a brake fluid to each of wheel pumps and push brake linings to generate a brake force and thereby reduces the speed of the golf cart 100 or even stops the golf cart 100.

Similarly, the second brake link 1345 moving synchronously with the third brake link 1346 and the fourth brake link 1347 also rotates in a clockwise direction (as shown in FIG. 3A). The second brake link 1345 drives the pedal 1341 to move by the first brake link 1344 and the elbow 1342.

When the central control unit 120 loses control to the electrically controlled brake assembly 132 while the golf cart 100 is moving, the electrically controlled brake assembly 132 may be deadlocked and may be unable to release the brake fluid. At this moment, the driver can use his/her foot to apply an external force to the pedal 1341 urgently in order to reduce the speed of the golf cart 100 or even stop the golf cart 100 with the mechanically controlled brake assembly 134.

Figure 6:
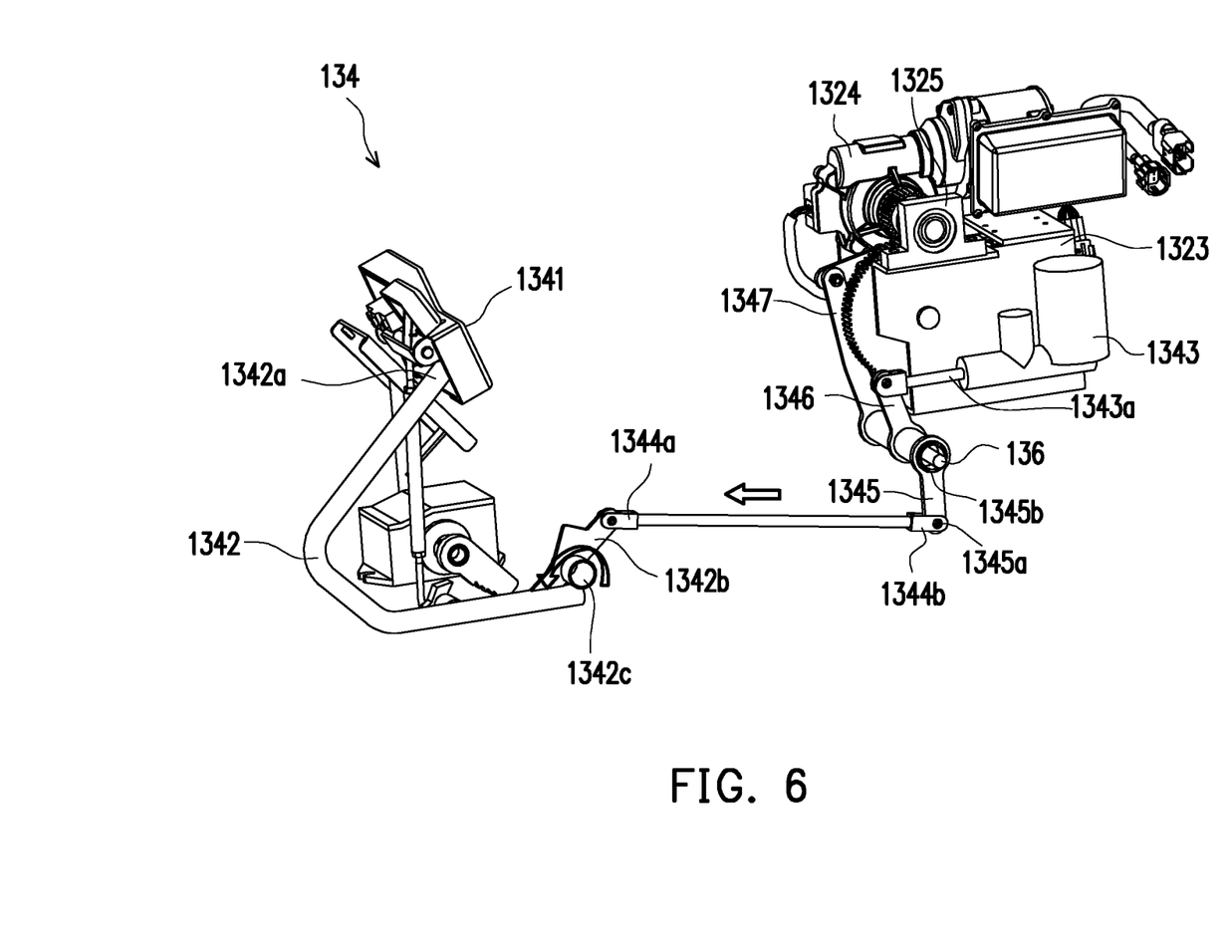
FIG. 6 is a schematic view showing the brake device when the mechanically controlled brake assembly of FIG. 3B is operated d.

Please refer to FIG. 6. When an external force is applied to the pedal 1341, the elbow 1342 rotates in a counterclockwise direction around the fulcrum 1342c of the pedal 1341 and further drives the first brake link 1344 connected to the second end 1342b of the elbow 1342 to move forward. The moving of the first brake link 1344 drives the second brake link 1345 to rotate in a clockwise direction around the shaft 136. The third brake link 1346 and the fourth brake link 1347, both installed on the shaft 136 and disposed in a distance to the second brake link 1345, move synchronously with the second brake link 1345.

In detail, the fourth brake link 1347 synchronously rotating in a clockwise direction drives the brake control link 1322 connected to the tenth end 1347b of the fourth brake link 1347 to move inward to the fixing base 1323.

In particular, because of the guide rail portion 1322a formed on the brake control link 1322 and the protruding portion 1329a formed in an appropriate location on the surface of the second gear 1329, wherein the protruding portion 1329a applied as a latch is fixed on the surface of the second gear 1329 and is installed compliantly into the guide rail portion 1322a, accordingly, the guide rail portion 1322a and the protruding portion 1329a may comply with each other to create a space for the brake control link 1322 to move relative to the second gear 1329, further avoiding the mechanically controlled brake assembly 134 from an operation failure caused by a deadlocked electrically controlled motor 1324. With the rotation of the fourth brake link 1347, the protruding portion 1329a moves from the left end of the guide rail portion 1322a to the right end of the guide rail portion 1322a.

At the same time, the third brake link 1346 is also driven to rotate in a clockwise direction. The third brake link 1346 further drives the adjustable rod 1343a of the brake pump 1343 to push a piston, deliver a brake fluid to each wheel pump and push a brake lining to generate a brake force and thereby reduces the speed of the golf cart 100 or even stops the golf cart 100.

It should be noted that, in the embodiments, the descriptions of relative locations such as up, down, left, right, front, back, behind or the like, and the descriptions of relative directions such as clockwise, counterclockwise, forward, backward or the like, are used with reference to the orientation of the figure(s) being described and are not intended to limit the scope of the invention. In detail, if based on a different basis, the relative locations and relative directions change accordingly. Taking FIG. 3A and FIG. 5 as examples, the second gear rotates in a clockwise direction in FIG. 3A, but when viewing from a different perspective, such as in FIG. 5, the second gear rotates in a counterclockwise direction.

To sum up, the brake device of the invention has both the electrically controlled brake assembly and the mechanically controlled brake assembly. Therefore, even if the electrically controlled brake assembly fails, the user may still apply the brake by the mechanically controlled brake assembly. As a result, an automatic driving vehicle using the brake device provides better protection to the passengers and improves safety.

It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. A brake device adapted for an automatic driving vehicle, comprising:
   an electrically controlled brake assembly comprising a main body and a brake control link;
   a mechanically controlled brake assembly; and
   a shaft, the mechanically controlled brake assembly is connected to the brake control link by the shaft;
   wherein the mechanically controlled brake assembly comprises:
      a pedal;
      an elbow having a first end, a second end and a fulcrum, wherein the first end is connected to the pedal, the fulcrum is located between the first end and the second end and is close to the second end;
      a brake link group connected between the second end of the elbow and the brake control link by the shaft; and
      a brake pump having an adjustable rod, wherein one link of the brake link group is connected to the adjustable rod of the brake pump
   wherein the main body comprises:
      a fixing base;
      an electrically controlled motor disposed on the fixing base;
      a bearing housing disposed on a wing of the fixing base;
      a first gear installed on the first axis rod and located between the electrically controlled motor and the bearing housing;
      a second axis rod, wherein two ends of the second axis rod are fixed on opposite first and second side walls of the fixing base;

a second gear installed on the second axis rod and engaged with the first gear, wherein a surface of the second gear has a protruding portion, the brake control link has a guide rail portion, and the protruding portion is located in the guide rail portion; and a bearing installed on the second axis rod close to the second gear.

2. The brake device according to claim 1, further comprising a resistance scale disposed on the fixing base for measuring a linear displacement of the brake control link.

3. The brake device according to claim 1, wherein the fixing base comprises:

the first side wall and the second side wall disposed along a vertical direction, wherein the second side wall has the wing extending horizontally;

a bottom plate extending horizontally from a bottom of the second side wall, wherein the first side wall is disposed on the bottom plate; and a top plate connected between a top of the first side wall and a top of the second side wall.

4. The brake device according to claim 3, wherein the bottom plate has an area greater than an area of the top plate.

5. The brake device according to claim 1, wherein the brake link group comprises:

a first brake link having a third end and a fourth end, wherein the third end is connected to the second end of the elbow;

a second brake link having a fifth end and a sixth end, wherein the fifth end is connected to the fourth end of the first brake link, and the sixth end is installed on the shaft;

a third brake link having a seventh end and an eighth end, wherein the seventh end is installed on the shaft in a distance to the sixth end; and a fourth brake link having a ninth end and a tenth end, wherein the ninth end is installed on the shaft in a distance to the seventh end, and the tenth end is connected to the brake control link.

6. An automatic driving vehicle, comprising:

a body having a plurality of seats and a steering wheel;

a central control unit disposed on the body; and a brake device electrically connected to the central control unit, the brake device comprising an electrically controlled brake assembly that is disposed under the plurality of seats, a mechanically controlled brake assembly and a shaft, wherein the electrically controlled brake assembly comprises a main body and a brake control link, and the mechanically controlled brake assembly is connected to the brake control link by the shaft, the mechanically controlled brake assembly comprising:

a pedal located under the steering wheel;

an elbow having a first end, a second end and a fulcrum, wherein the first end is connected to the pedal, the fulcrum is located between the first end and the second end and is close to the second end;

a brake link group connected between the second end of the elbow and the brake control link by the shaft; and a brake pump having an adjustable rod, wherein one link of the brake link group is connected to the adjustable rod of the brake pump wherein the main body comprises:

a fixing base;

an electrically controlled motor disposed on the fixing base;

a bearing housing disposed on a wing of the fixing base;

a first axis rod connected between the electrically controlled motor and the bearing housing;

a first gear installed on the first axis rod and located between the electrically controlled motor and the bearing housing;

a second axis rod, wherein two ends of the second axis rod are fixed on opposite first and second side walls of the fixing base;

a second gear installed on the second axis rod and engaged with the first gear, wherein a surface of the second gear has a protruding portion, the brake control link has a guide rail portion, and the protruding portion is located in the guide rail portion; and a bearing installed on the second axis rod close to the second gear.

7. The automatic driving vehicle according to claim 6, wherein when the electrically controlled brake assembly is in operation, the protruding portion is located in one end of the guide rail portion; when the electrically controlled brake assembly fails, an external force applied to the pedal drives the elbow and the brake link group to move, and the protruding portion moves from the end of the guide rail portion to the other end of the guide rail portion.

8. The automatic driving vehicle according to claim 6, wherein the brake device further comprises a resistance scale disposed on the fixing base for measuring a linear displacement of the brake control link.

9. The automatic driving vehicle according to claim 6, wherein the fixing base comprises:

the first side wall and the second side wall disposed along a vertical direction, wherein the second side wall has the wing extending horizontally;

a bottom plate extending horizontally from a bottom of the second side wall, wherein the first side wall is disposed on the bottom plate; and a top plate connected between a top of the first side wall and a top of the second side wall.

10. The automatic driving vehicle according to claim 6, wherein the brake link group comprises:

a first brake link having a third end and a fourth end, wherein the first brake link extends from under the plurality of seats to under the steering wheel for the third end to be connected to the second end of the elbow;

a second brake link having a fifth end and a sixth end, wherein the fifth end is connected to the fourth end of the first brake link, and the sixth end is installed on the shaft;

a third brake link having a seventh end and an eighth end, wherein the seventh end is installed on the shaft in a distance to the sixth end; and a fourth brake link having a ninth end and a tenth end, wherein the ninth end is installed on the shaft in a distance to the seventh end, and the tenth end is connected to the brake control link.

* * * * *